(12) United States Patent
Wu et al.

(10) Patent No.: US 10,879,601 B2
(45) Date of Patent: Dec. 29, 2020

(54) WEARABLE ELECTRONIC DEVICE AND ANTENNA SYSTEM THEREOF

(71) Applicant: PEGATRON CORPORATION, Taipei (TW)

(72) Inventors: Chien-Yi Wu, Taipei (TW); Ching-Hsiang Ko, Taipei (TW); Chao-Hsu Wu, Taipei (TW); Yu-Yi Chu, Taipei (TW); Chia-Chi Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 568 days.

(21) Appl. No.: 15/782,844

(22) Filed: Oct. 12, 2017

(65) Prior Publication Data

US 2018/0128924 A1    May 10, 2018

(30) Foreign Application Priority Data

Nov. 10, 2016   (TW) .............................. 105136681 A

(51) Int. Cl.
| | | |
|---|---|---|
| *H01Q 1/38* | (2006.01) | |
| *H01Q 5/307* | (2015.01) | |
| *G01S 19/24* | (2010.01) | |
| *G04G 17/02* | (2006.01) | |
| *G04G 21/04* | (2013.01) | |

(Continued)

(52) U.S. Cl.
CPC ............... *H01Q 1/38* (2013.01); *G01S 19/24* (2013.01); *G04G 17/02* (2013.01); *G04G 21/04* (2013.01); *H01Q 1/243* (2013.01); *H01Q 1/273* (2013.01); *H01Q 5/307* (2015.01)

(58) Field of Classification Search
CPC ......... H01Q 1/273; H01Q 5/307; G04G 17/02
See application file for complete search history.

(56) References Cited

U.S. PATENT DOCUMENTS

| | | | |
|---|---|---|---|
| 7,026,999 | B2 | 4/2006 | Umehara et al. |
| 9,257,740 | B2 | 2/2016 | Lyons et al. |
| 2002/0163473 | A1 | 11/2002 | Koyama et al. |

(Continued)

FOREIGN PATENT DOCUMENTS

| | | |
|---|---|---|
| CN | 101361282 A | 2/2009 |
| TW | I524595 B | 3/2016 |

(Continued)

*Primary Examiner* — Ricardo I Magallanes
(74) *Attorney, Agent, or Firm* — McClure, Qualey & Rodack, LLP

(57) ABSTRACT

A wearable electronic device includes a middle frame, a metallic side wall, a dielectric element, and a antenna wiring circuit. The metallic side wall is disposed at one side of the middle frame and has a slot. The dielectric element is disposed at the slot and electrically isolates the metallic side wall and the middle frame. The antenna wiring circuit is disposed at the dielectric element and comprises a antenna pattern. The antenna pattern comprises first and second metal portions. The first metal portion comprises a slit surrounded by first to third segments. The first segment has a signal feeding terminal. The second metal portion is connected to the third segment and is located in the slit. The metallic side wall performs coupled resonant with the first metal portion and the second metal portion to generate a resonant frequency band.

20 Claims, 6 Drawing Sheets

(51) Int. Cl.
*H01Q 1/24* (2006.01)
*H01Q 1/27* (2006.01)

(56) References Cited

U.S. PATENT DOCUMENTS

| | | |
|---|---|---|
| 2013/0214985 A1 | 8/2013 | Wolf et al. |
| 2014/0266923 A1* | 9/2014 | Zhou ..................... H01Q 1/243 |
| | | 343/702 |
| 2014/0292590 A1* | 10/2014 | Yoo ....................... H01Q 1/243 |
| | | 343/702 |
| 2016/0294038 A1 | 10/2016 | Lo et al. |

FOREIGN PATENT DOCUMENTS

| | | |
|---|---|---|
| TW | I542072 B | 7/2016 |
| WO | 2015166345 A2 | 11/2015 |

* cited by examiner

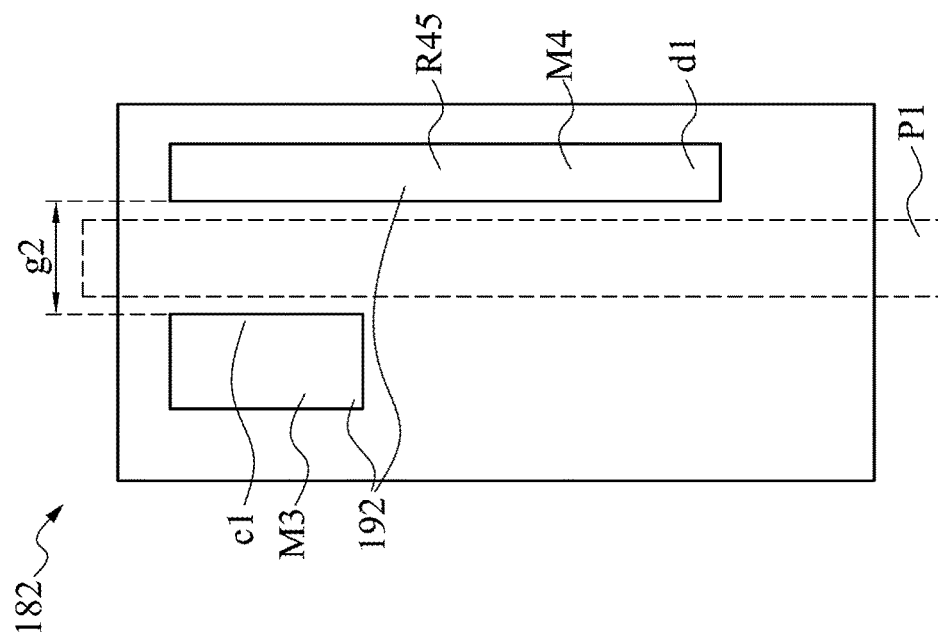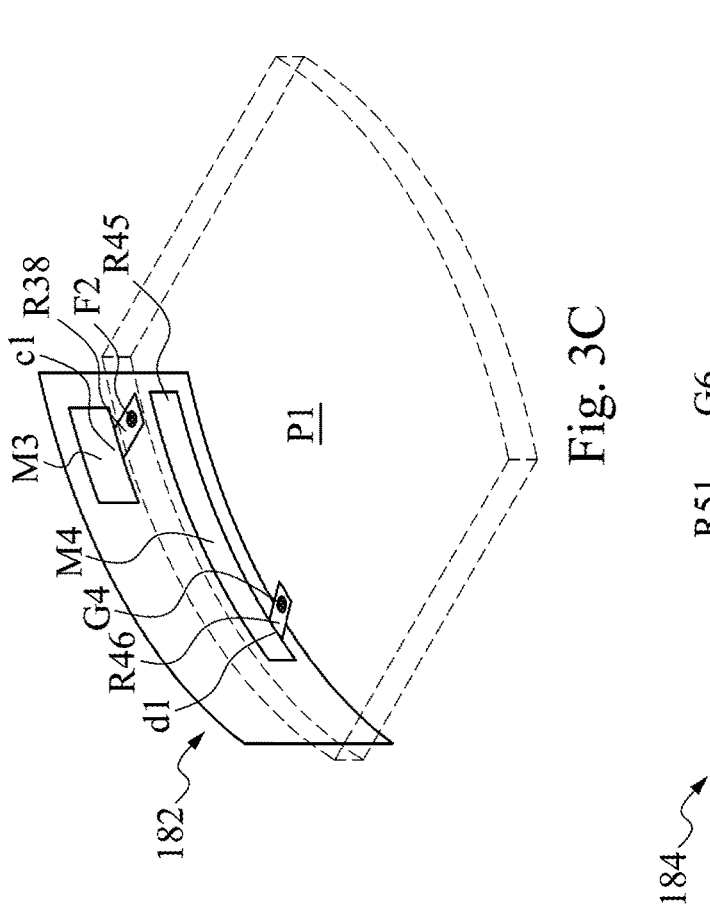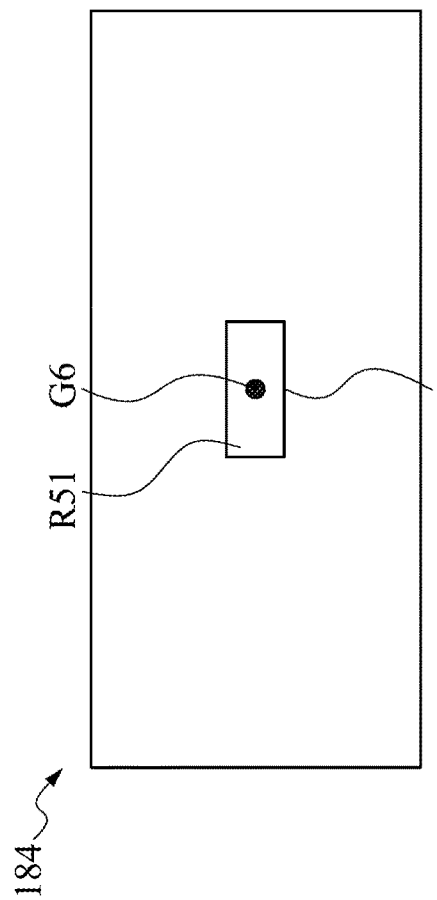

WEARABLE ELECTRONIC DEVICE AND ANTENNA SYSTEM THEREOF

RELATED APPLICATIONS

This application claims priority to Taiwan Application Serial Number 105136681, filed Nov. 10, 2016, which is herein incorporated by reference.

BACKGROUND

Field of Disclosure

The present disclosure relates to a wearable electronic device. More particularly, the present disclosure relates to a wearable electronic device and an antenna system thereof having a communication function.

Description of Related Art

Small-sized wearable electronic devices, such as smart watches, smart bracelets, and the like, are becoming increasingly popular. In order to make the products more attractive, many manufacturers tend to use full-metal body designs. However, smart equipment usually dispose antennas to provide wireless communication functions, and the full-metal body designs significantly increase the difficulty of antenna installation. In addition, owing to the spatial constraint, the ground contact area of the small-sized wearable electronic devices is smaller. If multiple antennas are intended to be disposed in the device, the antennas will interfere with one another, thus causing the problem of poor isolation.

SUMMARY

In order to allow multiple antennas to be disposed in the full-metal body small-sized wearable electronic device and allow the full-metal body small-sized wearable electronic device to send and receive signals at multiple antenna frequency bands, and effectively improve the problem, such as poor isolation between antennas, generated because the interior space of the product is excessively small, a wearable electronic device is provided. The wearable electronic device comprises a middle frame, a first metallic side wall, a first dielectric element, and a first antenna wiring circuit. The first metallic side wall is disposed at a first side of the middle frame and has a first slot. The first dielectric element is disposed at the first slot and electrically isolates the first metallic side wall and the middle frame. The first antenna wiring circuit is disposed at the first dielectric element and comprises a first antenna pattern. The first antenna pattern comprises a first metal portion and a second metal portion. The first metal portion comprises a first segment, a second segment, and a third segment. The first segment, the second segment, and the third segment are circumferentially connected to form a first slit. The first segment has a first signal feeding terminal, and the third segment has a first ground point. The second metal portion is connected to the third segment and is located in the first slit. The first metallic side wall is coupled to and resonant with the first metal portion and the second metal portion to generate a first resonant frequency band.

The disclosure provides an antenna system. The antenna system is adapted to a wearable electronic device. The wearable electronic device comprises a first metallic side wall. The antenna system comprises a first antenna wiring circuit, and the first antenna wiring circuit comprises a first antenna pattern. The first antenna pattern comprises a first metal portion and a second metal portion. The first metal portion comprises a first segment, a second segment, and a third segment. The first segment, the second segment, and the third segment are circumferentially connected to form a first slit. The first segment has a first signal feeding terminal. The third segment has a first ground point. The second metal portion is connected to the third segment and is located in the first slit. The first metal portion and the second metal portion are coupled to and resonant with a first metallic side wall of the wearable electronic device to generate a resonant frequency band.

Owing to the special design of the dielectric elements according to the present disclosure, the antennas can be disposed at the dielectric elements so as to be perpendicular to a bottom surface of the wearable electronic device, which significantly increases the flexibility of employing the interior space of the wearable electronic device. In addition, the metallic side walls further serve as one part that resonates with the antennas according to the present disclosure. As a result, even though the metallic body is used, the antennas of the wearable electronic device still can have good sending and receiving efficacies and sending and receiving qualities.

It is to be understood that both the foregoing general description and the following detailed description are by examples, and are intended to provide further explanation of the disclosure as claimed.

BRIEF DESCRIPTION OF THE DRAWINGS

FIG. 3C depicts a schematic diagram of an antenna pattern of a wearable electronic device according to one embodiment of the present disclosure;

FIG. 3D depicts a schematic diagram of an antenna pattern of a wearable electronic device according to one embodiment of the present disclosure;

FIG. 3E depicts a schematic diagram of an antenna pattern of a wearable electronic device according to one embodiment of the present disclosure;

DESCRIPTION OF THE EMBODIMENTS

Figure 1:
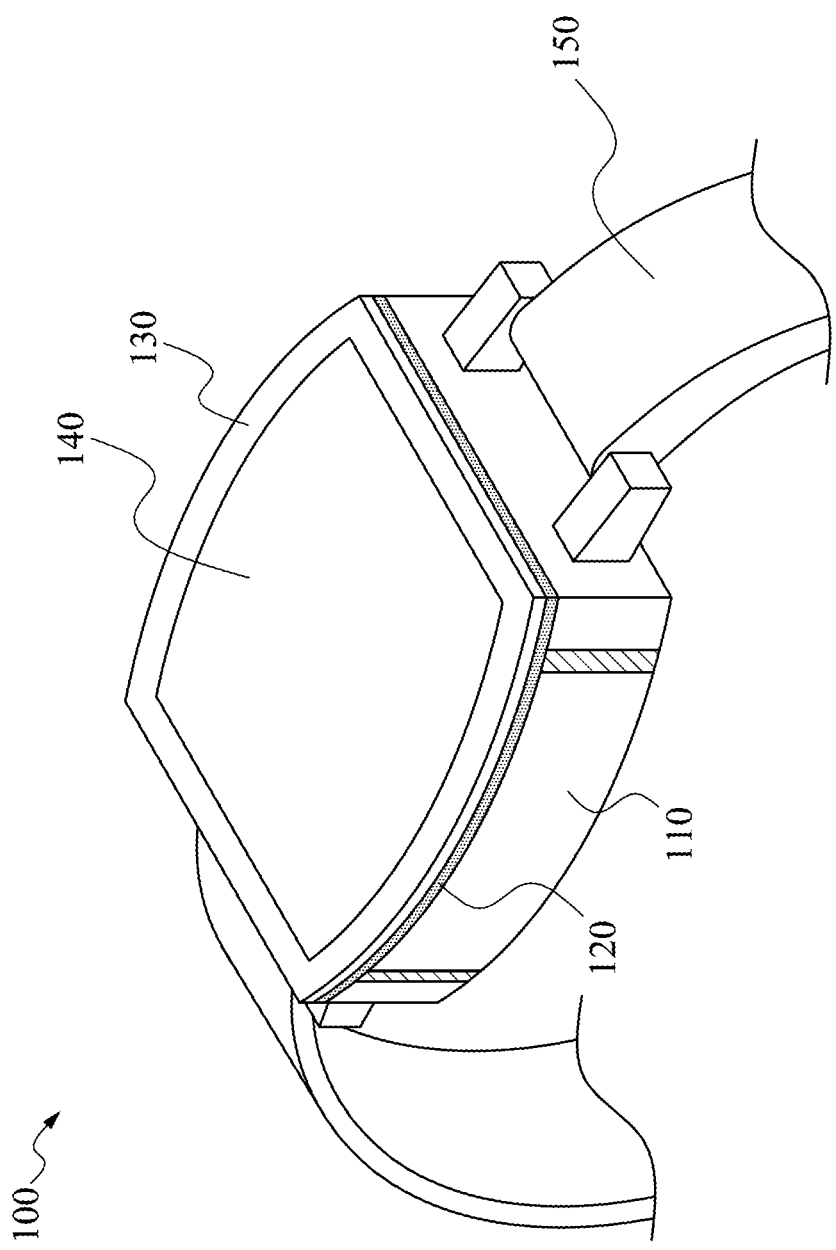
FIG. 1 depicts a schematic diagram of a wearable electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 depicts a schematic diagram of a wearable electronic device 100 according to one embodiment of the present disclosure. The wearable electronic device 100 is, for example, a watch. The wearable electronic device 100 has a middle frame 110, a dielectric bracing component 120, a bezel 130, a display panel 140, and a wearing component 150. The dielectric bracing component 120 may be plastic or any non-conductive material. The dielectric bracing component 120 is disposed at one side of the middle frame 110, that is, on the middle frame 110 and is configured to separate the middle frame 110 and the bezel 130. The bezel 130 is disposed at one side of the dielectric bracing component 120 opposite to the middle frame 110, that is, on the dielectric bracing component 120 and is configured to carry the display panel 140.

If the bezel 130 is made of a metallic material, a distance of, for example, more than 1 mm is needed between the middle frame 110 and the bezel 130. That is, the dielectric bracing component 120 is required to have a thickness of, for example, more than 1 mm to avoid generation of undesired interferences or influences on antennas of the wearable electronic device 100. It should be understood that there is no necessity to dispose the dielectric bracing component 120 between a metallic side wall and the bezel 130 if the bezel 130 is not made of metal and is disposed by using a non-conductive material, such as plastic, glass, or the like. A description of the two situations where the bezel 130 is a metallic material and a non-metallic material is provided as follows.

Figure 2:
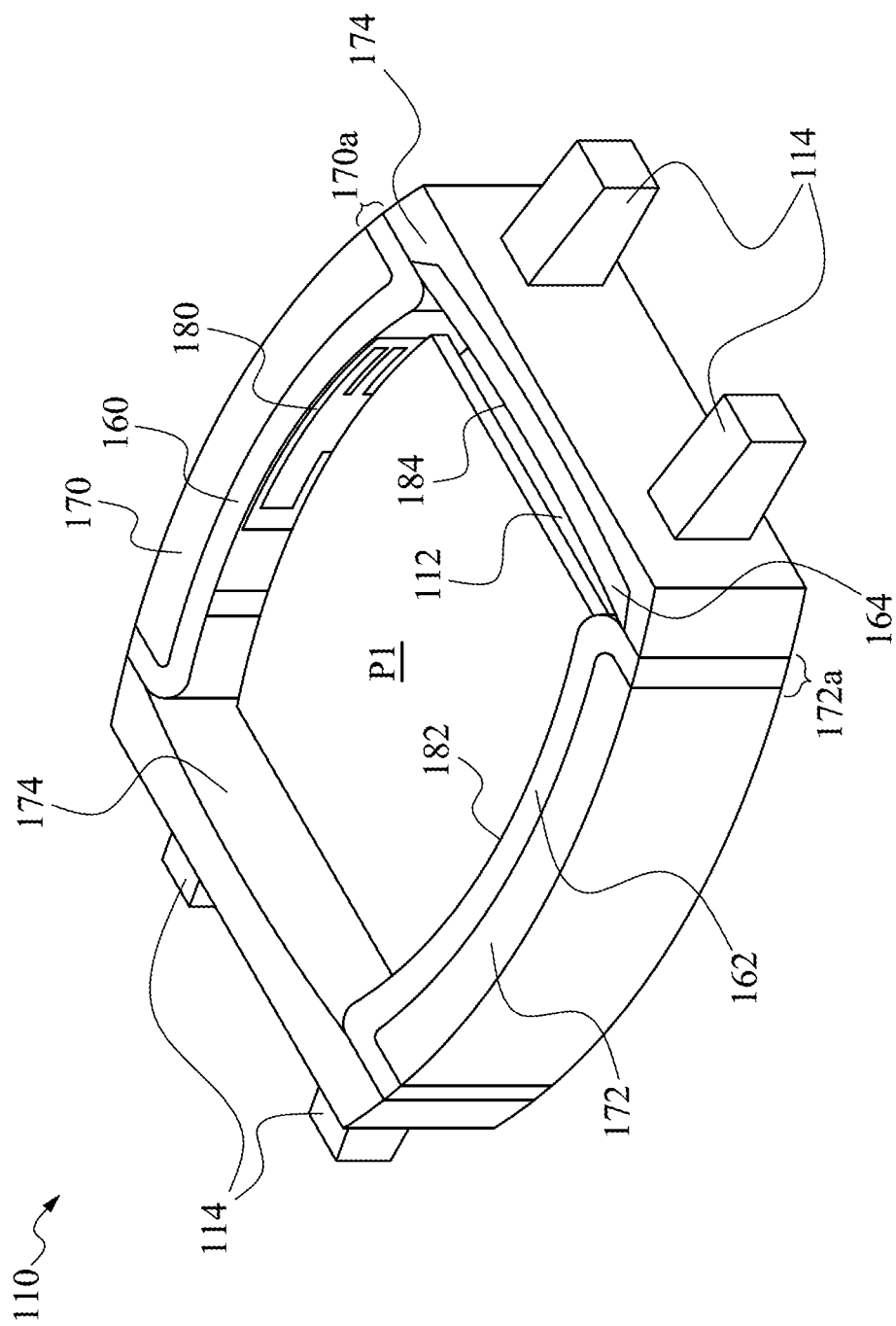
FIG. 2 depicts a schematic diagram of a major structure of a wearable electronic device according to one embodiment of the present disclosure.

The display panel 140 is, for example, a display screen of a smart watch, and the wearing component 150 is a wearing portion, such as a band, etc. According to the present disclosure, the wearing component 150 may be made of any material, such as metal, leather, plastic, or the like. A schematic diagram of a major structure of the wearable electronic device 100 according to one embodiment of the present disclosure is depicted in FIG. 2. In FIG. 2, the wearable electronic device 100 has a metallic bottom surface 112, a first dielectric element 160, a first metallic side wall 170, a second dielectric element 162, a second metallic side wall 172, a third dielectric element 164, two third metallic side walls 174, and a system ground contact surface P1.

In brief, the middle frame 110 according to the present embodiment is surrounded by the first metallic side wall 170, the second metallic side wall 172, and the two third metallic side walls 174. The first metallic side wall 170 is opposite to the second metallic side wall 172, and the two third metallic side walls 174 are opposite to each other. The third dielectric element 164 is a selective component and is described as follows. In addition, the middle frame 110 also has four attachment structures 114 for attaching the wearing component 150. The four attachment structures 114 are disposed at outsides of the two third metallic side walls 174. Or, in one embodiment, the four attachment structures 114 may be respectively disposed at outsides of the first metallic side wall 170 and the second metallic side wall 172.

The first metallic side wall 170 and the first dielectric element 160 are disposed at a first side (right side) of the middle frame 110, and the second metallic side wall 172 and the second dielectric element 162 are disposed at a second side (left side) of the middle frame 110. The first metallic side wall 170 comprises a first slot 170a. The second metallic side wall 172 comprises a second slot 172a. The first dielectric element 160 is disposed in the first slot 170a and a shape of the first dielectric element 160 conforms to a shape of the first slot 170a. The second dielectric element 162 is disposed in the second slot 172a and a shape of the second dielectric element 162 conforms to a shape of the second slot 172a. The first slot 170a and the second slot 172a are, for example, U-shaped slots, so that the first dielectric element 160 and the second dielectric element 162 are, for example, in a U shape. The first metallic side wall 170 is electrically isolated from the metallic bottom surface 112 and the two third metallic side walls 174 through the first dielectric element 160, and the second metallic side wall 172 is electrically isolated from the metallic bottom surface 112 and the two third metallic side walls 174 through the second dielectric element 162.

Thicknesses of the first dielectric element 160 and the second dielectric element 162 are, for example, from 1 mm to 2 mm. Dimensions of the first metallic side wall 170 and the second metallic side wall 172 are, for example, 38 mm×10 mm×1 mm. The system ground contact surface P1 is disposed inside the middle frame 110 and the system ground contact surface P1 and the middle frame 110 have, for example, at least six separated ground points, so that the middle frame 110 is more completely grounded. The ground points of the system ground contact surface P1 and the middle frame 110 may be designed depending on practical applications, and the present disclosure is not limited in this regard.

A first antenna wiring circuit 180 is disposed at a surface of the first dielectric element 160 facing an inside of the middle frame 110. The first antenna wiring circuit 180 is, for example, a flexible printed circuit (FPC) having dimensions of 42 mm×10 mm×0.2 mm. The first antenna wiring circuit 180 has an antenna pattern. In one embodiment, when the bezel 130 is made of a non-metallic material, the antenna pattern is shown in a schematic diagram of an antenna pattern of the first antenna wiring circuit 180 according to one embodiment of the present disclosure depicted in FIG. 3A.

Figure 3B:
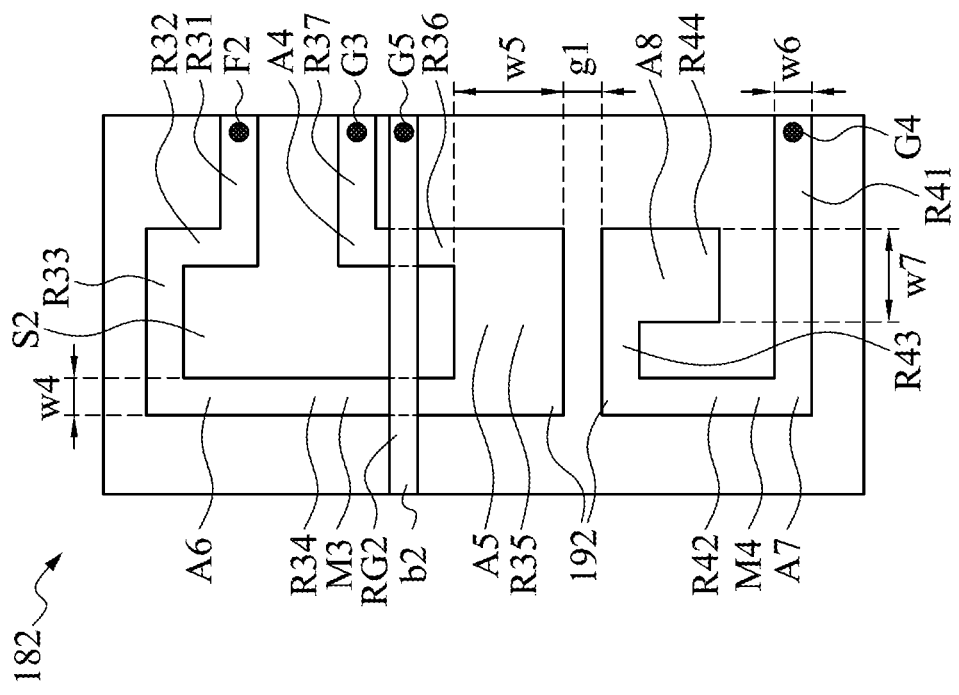
FIG. 3B depicts a schematic diagram of an antenna pattern of a wearable electronic device according to one embodiment of the present disclosure.
Figure 3A:
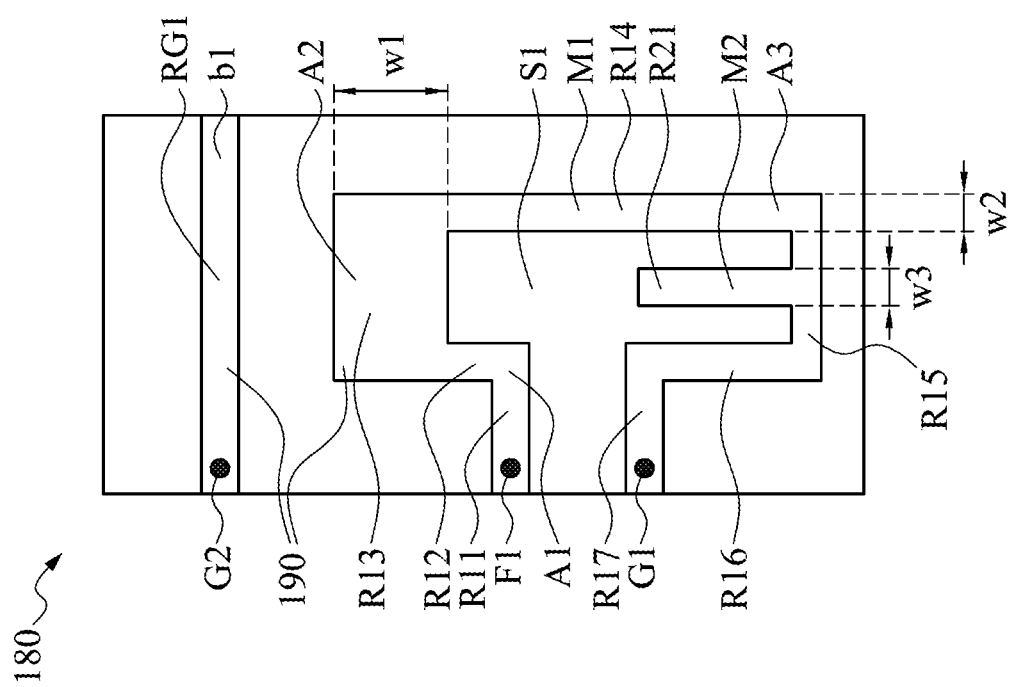
FIG. 3A depicts a schematic diagram of an antenna pattern of a wearable electronic device according to one embodiment of the present disclosure.

In FIG. 3A, the first antenna wiring circuit 180 has a first antenna pattern 190. The first antenna pattern 190 has a first metal portion M1, a second metal portion M2, a first signal feeding terminal F1, a first ground point G1, a ground path RG1. One end of the ground path RG1 is a second ground point G2. The ground path RG1 is a conductive path between a right-sided point b1 and the second ground point G2 on the left side, and is not in electrical contact with the first metal portion M1 and the second metal portion M2. The first ground point G1 and the second ground point G2 are electrically connected to the system ground contact surface P1. The first signal feeding terminal F1 is disposed at one end of the first metal part M1, and the first ground point G1 is disposed at another end of the first metal portion M1. The first metal portion M1 is configured to operate similarly to a loop antenna. The first signal feeding terminal F1 is configured to be connected to a positive terminal of a coaxial transmission line signal of a wireless transceiver device (not shown in the figure), and the first ground point G1 is configured to be connected to a negative terminal of the coaxial transmission line signal of the wireless transceiver device and connected to the system ground contact surface P1 at the same time.

The first metal portion M1 is constituted by paths R11, R12, R13, R14, R15, R16, and R17 sequentially connected in series, and the second metal portion M2 is formed by a path R21. The path R12 and the path R16 are arranged in a line. The path R12 and the path R16 are arranged in parallel with the path R14 and the path R21, and the path R13 is arranged in parallel with the path R15. The first metal portion M1 may be approximately divided into a first segment A1 constituted by the paths R11 and R12, a second segment A2 formed by the path R13, and a third segment A3 constituted by the paths R14, R15, R16, and R17. The first signal feeding terminal F1 is located at one end of the first segment A1, another end of the first segment A1 is connected to one end of the second segment A2. Another end of the second segment A2 is connected to one end of the third segment A3, and the first ground point G1 is located at another end of the third segment A3. The first segment A1, the second segment A2, and the third segment A3 surround a first slit S1. As can be seen from FIG. 3A, the second metal portion M2 is connected to one side of the first metal portion M1. In greater detail, the second metal portion M2 is connected to an approximate center of the path R15 in the third segment A3 and is located in the first slit S1.

In one embodiment, a length of the path R11 is approximately 2 mm, a length of the path R12 is approximately 8 mm, a length of the path R13 is approximately 4 mm, a length of the path R14 is approximately 20 mm, a length of the path R15 is approximately 4 mm, a length of the path R16 is approximately 8 mm, and a length of the path R17 is approximately 2 mm. That is, a total length of the first metal portion M1 is approximately 48 mm. In addition, a path width w2 of the first segment A1 and the third segment A3 of the first metal portion M1 is, for example, from 0.5 to 1 mm, and a path width w1 of the second segment A2 is, for example, from 5 to 6 mm. That is, the path width w1 of the second segment A2 is greater than the path width w2 of the first segment A1 and the third segment A3. A total length of the second metal portion M2 is 8 mm, and a path width w3 of the second metal portion M2 is from 0.5 to 1 mm, which is approximately the same as the path width w2 of the first segment A1 and the third segment A3 of the first metal portion M1.

The first metallic side wall 170 is electrically connected to the ground path RG1 so as to be grounded through the second ground point G2. By disposing the first metallic side wall 170 and the first antenna wiring circuit 180, the first metallic side wall 170 and the first antenna pattern 190 may collaboratively perform coupled resonance to generate a first resonant frequency band. In the present embodiment, the first resonant frequency band may be, for example, a resonant frequency band of a 3G antenna (2100 MHz (B1), 1900 MHz (B2), and 850 MHz (B5)). The path lengths and the path widths (w1, w2, w3) of the first metal portion M1 and/or the second metal portion M2 are related to a resonant frequency and impedance matching of an antenna. Hence, a resonant frequency and impedance matching of the first resonant frequency band can be adjusted by adjusting the path lengths and/or the path widths of the first metal portion M1 and/or the second metal portion M2.

In the above embodiment, a second antenna wiring circuit 182 is disposed on a surface of the second dielectric element 162 facing the inside of the middle frame 110. The second antenna wiring circuit 182 is also, for example, a flexible printed circuit having the dimensions of 42 mm×10 mm×0.2 mm. A description is provided with reference to FIG. 3B. FIG. 3B depicts a schematic diagram of an antenna pattern of the second antenna wiring circuit 182 when the bezel 130 is made of a non-metallic material according to one embodiment or the present disclosure. In FIG. 3B, the second antenna wiring circuit 182 has a second antenna pattern 192. The second antenna pattern 192 has a third metal portion M3 and a fourth metal portion M4. The third metal portion M3 and the fourth metal portion M4 are adjacent to each other with a distance g1. The distance g1 is approximately 2 mm. The third metal portion M3 is configured to operate similarly to a loop antenna, and has a second signal feeding terminal F2 and a third ground point G3. The second signal feeding terminal F2 is configured to be connected to the positive terminal of the coaxial transmission line signal of the wireless transceiver device (not shown in the figure), and the third ground point G3 is configured to be connected to the negative terminal of the coaxial transmission line signal of the wireless transceiver device and connected to the system ground contact surface P1 at the same time.

A shape of the third metal portion M3 is similar to a shape of the first metal portion M1. The third metal portion M3 is constituted by paths R31, R32, R33, R34, R35, R36, and R37 sequentially connected in series. The path R32 and the path R36 are arranged in a line. The path R32 and the path R36 are arranged in parallel with the path R34, and the path R33 is arranged in parallel with the path R35. The third metal portion M3 may be approximately divided into a fourth segment A4 constituted by the paths R36 and R37, a fifth segment A5 formed by the path R35, and a sixth segment A6 constituted by the paths R31, R32, R33, and R34. The fourth segment A4, the fifth segment A5, and the sixth segment A6 are sequentially connected in series and surround a second slit S2. The third ground point G3 is located at one end of the fourth segment A4, another end of the fourth segment A4 is connected to one end of the fifth segment A5. Another end of the fifth segment A5 is connected to one end of the sixth segment A6, and the second signal feeding terminal F2 is located at another end of the sixth segment A6.

In one embodiment, a length of the path R31 is approximately 2 mm, a length of the path R32 is approximately 2 mm, a length of the path R33 is approximately 3 mm, a length of the path R34 is approximately 18 mm, a length of the path R35 is approximately 3 mm, a length of the path R36 is approximately 14 mm, and a length of the path R37 is approximately 2 mm. That is, a total length of the third metal portion M3 is approximately 44 mm. In addition, a path width w4 of the fourth segment A4 and the sixth segment A6 of the third metal portion M3 is, for example, 0.5 mm, and a path width w5 of the fifth segment A5 is, for example, from 6 to 7 mm. That is, the path width w5 of the fifth segment A5 is greater than the path width w4 of the fourth segment A4 and the sixth segment A6.

The fourth metal portion M4 is constituted by paths R41, R42, R43, and R44 sequentially connected in series. As can be seen from FIG. 3B, the path R41 is arranged in parallel with the path R43, and the path R42 is arranged in parallel with the path R44. The fourth metal portion M4 may be approximately divided into a seventh segment A7 constituted by the paths R41, R42, and R43 and an eighth segment A8 formed by the path R44. The seventh segment A7 is approximately in a U shape. One end of the seventh segment A7 has a fourth ground point G4, and another end of the seventh segment A7 is connected to the eighth segment A8. The fourth ground point G4 is electrically connected to the system ground contact surface P1.

In one embodiment, a length of the path R41 is approximately 5 mm, a length of the path R42 is approximately 5 mm, a length of the path R43 is approximately 3 mm, and a length of the path R44 is approximately 2.5 mm. That is, a total length of the fourth metal portion M4 is approximately 15.5 mm. A path width w6 of the seventh segment A7 of the fourth metal portion M4 is approximately 0.5 mm. A path width w7 of the eighth segment A8 is approximately 2 mm. That is, the path width w7 of the eighth segment A8 is greater than the path width w6 of the seventh segment A7.

The second metallic side wall 172 is connected to the system ground contact surface P1 by crossing the second dielectric element 162 through a ground path RG2 so as to be grounded. One end of the ground path RG2 has a fifth ground point G5, and the ground path RG2 is a straight bar path between a right-sided point b2 and the fifth ground point G5 on the left side. The ground path RG2 is, for example, a metallic conductive member or a conductive wire. A vertical projection of the ground path RG2 on the second antenna pattern 192 overlaps the third metal portion M3, but the ground path RG2 actually is not in electrical contact with the third metal portion M3, that is, a distance exists between the ground path RG2 and the third metal portion M3 in a three-dimensional space. In another embodiment, the second metallic side wall 172 may be floating with the ground path RG2, that is, the second metallic side wall 172 is spaced apart from the ground path RG2 by a distance so as to generate an effect similar to electrical connection by way of capacitive coupling.

By disposing the second metallic side wall 172 and the second antenna wiring circuit 182, the second metallic side wall 172 and the third metal portion M3 in the second antenna pattern 192 may collaboratively perform coupled resonance to generate a second resonant frequency band and a third resonant frequency band, and the second metallic side wall 172 and the fourth metal portion M4 may collaboratively perform coupled resonance to generate a fourth resonant frequency band. In the present embodiment, the second resonant frequency band may be, for example, a resonant frequency band of a Bluetooth and/or Wi-Fi 2.4G antenna, the third resonant frequency band may be, for example, a resonant frequency band of a Wi-Fi 5G antenna, and the fourth resonant frequency band may be, for example, a resonant frequency band of a GPS antenna (approximately 1575 MHz).

The path lengths and the path widths (w4, w5, w6. w7) of the third metal portion M3 and/or the fourth metal portion M4 are related to a resonant frequency and impedance matching of an antenna. Hence, a resonant frequency and impedance matching of the second antenna wiring circuit 182 can be adjusted by adjusting the path lengths and/or the path widths of the third metal portion M3 and/or the fourth metal portion M4.

In another embodiment of the present disclosure, when the bezel 130 is made of a metallic material, the second antenna pattern 192 of the second antenna wiring circuit 182 needs to be properly adjusted to maintain the efficacies of the second resonant frequency band, the third resonant frequency band, and the fourth resonant frequency band. A description is provided with reference to FIG. 3C and FIG. 3D. FIG. 3C depicts a schematic diagram of a three-dimensional relationship between the second antenna pattern 192 and the system ground contact surface P1 of the wearable electronic device 100 according to one embodiment of the present disclosure. In the present embodiment, the second antenna pattern 192 has the third metal portion M3 and the fourth metal portion M4. The system ground contact surface P1 and the second antenna pattern 192 are so disposed that they are perpendicular to each other. The third metal portion M3 is located above a horizontal plane of the system ground contact surface P1, the fourth metal portion M4 is located below the horizontal plane of the system ground contact surface P1, as shown in FIG. 3C.

In FIG. 3C, the third metal portion M3 is connected to the second signal feeding terminal F2 through a path R38 perpendicular to the third metal portion M3 itself at a point c1, so that the third metal portion M3 is connected to the positive terminal of the coaxial transmission line signal of the wireless transceiver device as mentioned previously. The fourth metal portion M4 is connected to the fourth ground point G4 though a path R46 perpendicular to the fourth metal portion M4 itself at a point d1, so that the fourth metal portion M4 is electrically connected to the system ground contact surface P1.

FIG. 3D depicts a schematic diagram of a plane of the second antenna pattern 192 of the second antenna wiring circuit 182 in FIG. 3C. Since the bezel 130 is made of a metallic material, even though the dielectric bracing component 120 is used to electrically isolate the bezel 130 from the second metallic side wall 172 and the second antenna wiring circuit 182 on the second dielectric element 162, the second antenna wiring circuit 182 is still somewhat influenced. Therefore, the third metal portion M3 and the fourth metal portion M4 are adjusted correspondingly so as to be resonant with the second metallic side wall 172 to generate the second resonant frequency band, the third resonant frequency band, and the fourth resonant frequency band. In this example, the third metal portion M3 is in a rectangular shape and does not have the first slit S1, and the point c1 is located at a center of a boundary on one side of the third metal portion M3. The fourth metal portion M4 is formed by a path R45. The path R45 is in a straight bar, and is adjacent to the third metal portion M3 with a distance g2. The distance g2 is approximately 1 mm.

According to the embodiment in which the bezel 130 is metal, the first antenna pattern 190 of the first antenna wiring circuit 180 is approximately the same as that of the embodiment shown in FIG. 3A. It is noted that a parasitic path may be added to the middle frame 110 to increase an antenna high frequency efficiency of the first antenna wiring circuit 180 at the first resonant frequency band. A description is provided with reference to FIG. 2 and FIG. 3E. FIG. 3E depicts a schematic diagram of an antenna pattern of the wearable electronic device 100 according to one embodiment of the present disclosure. In this example, the middle frame 110 further has the third dielectric element 164. The third dielectric element 164 is located on one side of one of the third metallic side walls 174 of the middle frame 110, and allows the one of the third metallic side walls 174 to be electrically isolated from the metallic bottom surface 112, as shown in FIG. 2. The third dielectric element 164 may be an independent component, or may be integrally formed with the first dielectric element 160 and/or the second dielectric element 162, and the present disclosure is not limited in this regard.

A third antenna wiring circuit 184 is disposed on one side surface of the third dielectric element 164 facing the inside of the middle frame 110. In FIG. 3E, the third antenna wiring circuit 184 has an antenna pattern 194. The antenna pattern 194 is formed by a parasitic path R51. The parasitic path R51 is, for example, a quarter-wave conductive path, which is electrically connected to the system ground contact surface P1 through a sixth ground point G6 and can resonate to generate a frequency of approximately 1900 MHz so as to improve an antenna high frequency efficiency at the first resonant frequency band.

Figure 4:
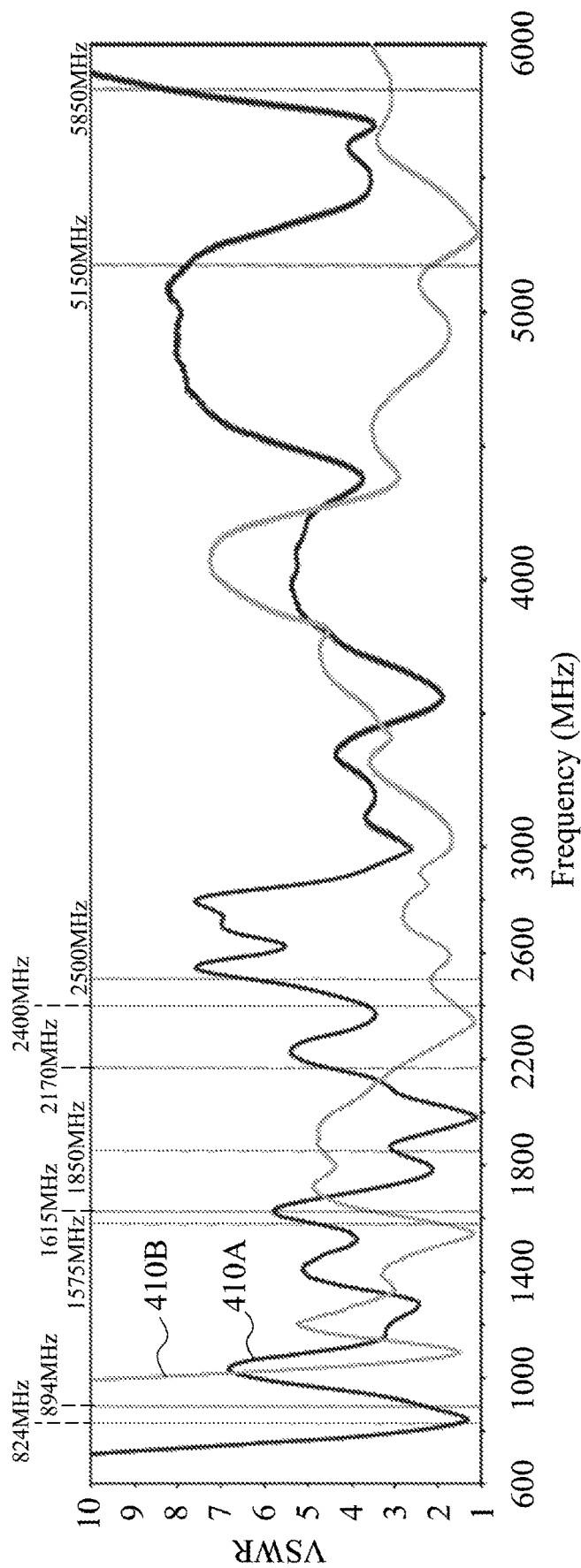
FIG. 4 depicts relationship diagrams between a voltage standing wave ratio and a frequency of antennas of a wearable electronic device according to one embodiment of the present disclosure.

FIG. 4 depicts relationship diagrams between a voltage standing wave ratio (VSWR) and a frequency of antennas when the bezel 130 made of metal is used in the wearable electronic device 100 according to one embodiment of the present disclosure. In FIG. 4, a unit of the vertical coordinate is the VSWR, a unit of the horizontal coordinate is the frequency (MHz), a curve 410A is a plot of VSWR versus frequency of the first antenna wiring circuit 180, and a curve 410B is a plot of VSWR versus frequency of the second antenna wiring circuit 182. As can be seen in the figure, the VSWR of the wearable electronic device 100 at the first resonant frequency band (3G frequency band: 2100 MHz (B1), 1900 MHz (B2), and 850 MHz (B5)) generated by the first antenna wiring circuit 180 approaches 1, which shows good impedance matching. The VSWR of the wearable electronic device 100 at the second resonant frequency band (Bluetooth/Wi-Fi 2.4G frequency band), the third resonant frequency band (Wi-Fi 5G frequency band), and the fourth resonant frequency band (GPS frequency band: 1575 MHz) generated by the second antenna wiring circuit 182 also approaches 1, which also shows good impedance matching.

Figure 5:
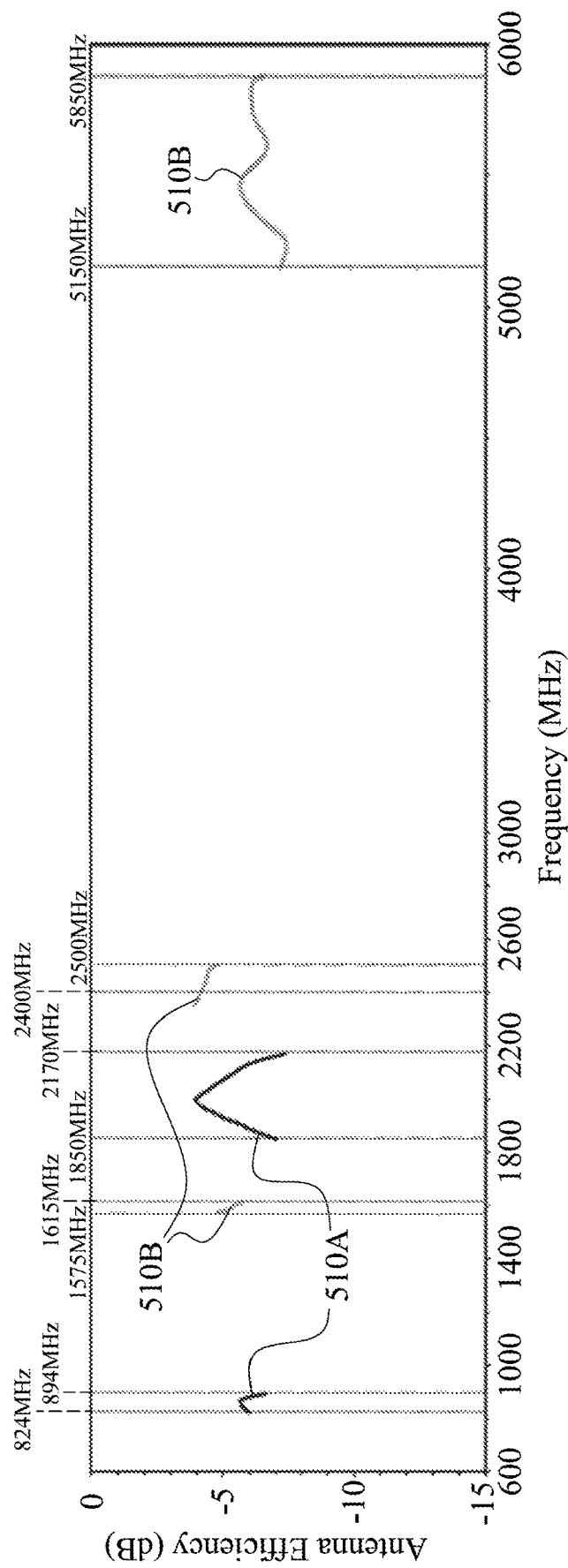
FIG. 5 depicts relationship diagrams between an antenna efficiency and a frequency of a wearable electronic device according to one embodiment of the present disclosure.

FIG. 5 depicts relationship diagrams between an antenna efficiency and a frequency of the wearable electronic device 100 according to one embodiment of the present disclosure. In FIG. 5, a unit of the vertical coordinate is the antenna efficiency (dB), a unit of the horizontal coordinate is the frequency (MHz), a curve 510A is a plot of antenna efficiency versus frequency of the first antenna wiring circuit 180, and a curve 510B is a plot of antenna efficiency versus frequency of the second antenna wiring circuit 182. As can be seen in the figure, the antenna efficiency of the wearable electronic device 100 at the first resonant frequency band (3G frequency band: 2100 MHz (B1), 1900 MHz (B2), and 850 MHz (B5)) generated by the first antenna wiring circuit 180 is approximately above −6 dB. The antenna efficiency of the wearable electronic device 100 at the second resonant frequency band (Bluetooth/Wi-Fi 2.4G frequency band), the third resonant frequency band (Wi-Fi 5G frequency band), and the fourth resonant frequency band (GPS frequency band: 1575 MHz) generated by the second antenna wiring circuit 182 is approximately above −7 dB.

According to the present disclosure, the electronic device having the metallic middle frame can have more flexible space to install more functional components. In addition, the second resonant frequency band, the third resonant frequency band, and the fourth resonant frequency band generated by the second antenna wiring circuit 182 share the same signal feeding terminal F2, so that the problem of isolation does not exist. By implementing the technology according to the present disclosure, not only can the small-sized wearable electronic devices send and receive signals at multiple antenna frequency bands, but the small-sized wearable electronic devices can also be designed to have metallic bodies under the circumstances that the specification of human specific absorption rate (SAR) is satisfied.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wearable electronic device comprising:
   a middle frame, comprising:
   a metallic bottom surface;
   a first metallic side wall disposed at a first side of the middle frame and having a first slot;
   a first dielectric element disposed at the first slot, wherein the first metallic side wall is electrically isolated from the metallic bottom surface through the first dielectric element; and
   a first antenna wiring circuit disposed at the first dielectric element and comprising a first antenna pattern, the first antenna pattern comprising:
   a first metal portion comprising a first segment, a second segment, and a third segment, the first segment, the second segment, and the third segment being circumferentially connected to form a first slit, the first segment having a first signal feeding terminal, and the third segment having a first ground point; and
   a second metal portion connected to the third segment and being located in the first slit, the first metallic side wall is arranged to operably perform coupled resonance with the first metal portion and the second metal portion to generate a first resonant frequency band.

2. The wearable electronic device of claim 1, wherein a path width of the second segment is greater than a path width of the first segment and the third segment, and a path width of the second metal portion is the same as the path width of the first segment and the third segment.

3. The wearable electronic device of claim 1, wherein the first antenna pattern further comprises a ground path, one end of the ground path has a second ground point, the first metallic side wall is electrically coupled to the ground path so as to be grounded through the second ground point.

4. The wearable electronic device of claim 1, further comprising:
   a second metallic side wall disposed at a second side of the middle frame opposite to the first side and having a second slot;
   a second dielectric element disposed at the second slot and electrically isolating the second metallic side wall and the middle frame; and
   a second antenna wiring circuit disposed at the second dielectric element and comprising a second antenna pattern, the second antenna pattern comprising:
   a third metal portion having a second signal feeding terminal; and
   a fourth metal portion adjacent to the third metal portion with a distance.

5. The wearable electronic device of claim 4, wherein the third metal portion comprises a fourth segment, a fifth segment, and a sixth segment, the fourth segment, the fifth segment, and the sixth segment are connected to surround a second slit, the fourth segment has a third ground point, the second signal feeding terminal is located at the sixth segment, a path width of the fifth segment is greater than a path width of the fourth segment and the sixth segment.

6. The wearable electronic device of claim 4, wherein the fourth metal portion has a fourth ground point and the second metallic side wall is grounded, the second metallic side wall is resonant with the third metal portion to generate a second resonant frequency band and a third resonant frequency band, the second metallic side wall is resonant with the fourth metal portion to generate a fourth resonant frequency band.

7. The wearable electronic device of claim 4, wherein the fourth metal portion has a seventh segment and an eighth segment connected to each other, the seventh segment has a fourth ground point, a path width of the eighth segment is greater than a path width of the seventh segment.

8. The wearable electronic device of claim 4, wherein the fourth metal portion is in a straight bar.

9. The wearable electronic device of claim 8, further comprising:
   a system ground contact surface disposed perpendicular to the third metal portion and the fourth metal portion, wherein the third metal portion and the fourth metal portion are located at two opposite sides of a horizontal plane of the system ground contact surface.

10. The wearable electronic device of claim 4, further comprising:
a dielectric bracing component disposed at the middle frame; and
a metallic bezel disposed at the dielectric bracing component and being configured to carry a display panel.

11. The wearable electronic device of claim 4, further comprising:
a third dielectric element disposed at a third side of the middle frame, the third side being adjacent to the first side and the second side;
a third metallic side wall disposed at the third side of the middle frame, and the third metallic side wall being electrically isolated from a metallic bottom surface of the middle frame by using the third dielectric element; and
a third antenna wiring circuit disposed at the third dielectric element and comprising a third antenna pattern, wherein the third antenna pattern is a quarter-wave path.

12. An antenna system adapted to a wearable electronic device, the wearable electronic device comprising a middle frame, the middle frame comprising a first metallic side wall, a metallic bottom surface and a dielectric element, wherein the first metallic side wall is electrically isolated from the metallic bottom surface through the dielectric element, the antenna system comprising:
a first antenna wiring circuit disposed at the dielectric element and comprising a first antenna pattern, the first antenna pattern comprising:
a first metal portion comprising a first segment, a second segment, and a third segment, the first segment, the second segment, and the third segment being circumferentially connected to form a first slit, wherein the first segment has a first signal feeding terminal, the third segment has a first ground point; and
a second metal portion connected to the third segment and being located in the first slit, wherein the first metal portion and the second metal portion are arranged to operably perform coupled resonance with the first metallic side wall to generate a first resonant frequency band.

13. The antenna system of claim 12, wherein a path width of the second segment is greater than a path width of the first segment and the third segment, and a path width of the second metal portion is the same as the path width of the first segment and the third segment.

14. The antenna system of claim 12, wherein the first antenna pattern further comprises a ground path, one end of the ground path has a second ground point, the first metallic side wall is electrically coupled to the ground path so as to be grounded through the second ground point.

15. The antenna system of claim 12, wherein the wearable electronic device further comprises a second metallic side wall, the antenna system further comprises:
a second antenna wiring circuit comprising a second antenna pattern, the second antenna pattern comprising:
a third metal portion having a second signal feeding terminal; and
a fourth metal portion adjacent to the third metal portion with a distance.

16. The antenna system of claim 15, wherein the third metal portion comprises a fourth segment, a fifth segment, and a sixth segment, the fourth segment, the fifth segment, and the sixth segment are connected to surround a second slit, the fourth segment has a third ground point, the second signal feeding terminal is located at the sixth segment, a path width of the fifth segment is greater than a path width of the fourth segment and the sixth segment.

17. The antenna system of claim 15, wherein the fourth metal portion has a fourth ground point and the second metallic side wall is grounded, the third metal portion is resonant with the second metallic side wall to generate a second resonant frequency band and a third resonant frequency band, the fourth metal portion is resonant with the second metallic side wall to generate a fourth resonant frequency band.

18. The antenna system of claim 15, wherein the fourth metal portion has a seventh segment and an eighth segment connected to each other, the seventh segment has a fourth ground point, a path width of the eighth segment is greater than a path width of the seventh segment.

19. The antenna system of claim 15, wherein the fourth metal portion is in a straight bar.

20. The antenna system of claim 15, wherein the wearable electronic device further comprises a third metallic side wall, the antenna system further comprises:
a third antenna wiring circuit comprising a third antenna pattern, wherein the third antenna pattern is a quarter-wave path.

* * * * *